United States Patent

Manning et al.

[11] Patent Number: 5,870,538
[45] Date of Patent: Feb. 9, 1999

[54] SWITCH FABRIC CONTROLLER COMPARATOR SYSTEM AND METHOD

[75] Inventors: Thomas A. Manning, Northboro; Stephen A. Caldara, Sudbury; Stephen A. Hauser, Burlington, all of Mass.

[73] Assignees: Fujitsu Network Communications, Inc., Richardson, Tex.; Fujitsu Limited, Kawasaki, Japan

[21] Appl. No.: 685,195

[22] Filed: Jul. 18, 1996

Related U.S. Application Data

[60] Provisional application No. 60/001,498, Jul. 19, 1995.

[51] Int. Cl.[6] .................................................. H04L 12/56
[52] U.S. Cl. .................................... 395/183.18; 370/398
[58] Field of Search ........................... 395/183.2, 183.19, 395/183.18, 183.16, 185.09, 185.08, 185.07, 185.06, 185.01; 370/413, 326, 398, 216, 217, 218, 219, 220

[56] References Cited

U.S. PATENT DOCUMENTS

| 3,804,991 | 4/1974 | Hammond et al. ........................ 179/26 |
| 3,974,343 | 8/1976 | Cheney et al. ....................... 179/18 ES |
| 4,069,399 | 1/1978 | Barrett et al. ........................ 179/15 AL |

(List continued on next page.)

FOREIGN PATENT DOCUMENTS

| 0484943 | 5/1992 | European Pat. Off. ........ H04L 12/56 |
| 484943 | 3/1992 | Japan . |

OTHER PUBLICATIONS

Head of Line Arbitration in ATM Switches with Input–Output Buffering and Backpressure Control. By Hosein F. Badran and H. T. Mouftah, *Globecom* '91, pp. 0347–0351.
An Ascom Timeplex White Paper, *Meeting Critical Requirements with Scalable Enterprise Networking Solutions Based on a Unified ATM Foundation*, pp. 1–12, Apr. 1994 – Apr. 1995?.

Douglas H. Hunt, *ATM Traffic Management — Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994. .

(List continued on next page.)

*Primary Examiner*—Ly Hua
*Attorney, Agent, or Firm*—Weingarten, Schurgin, Gagnebin & Hayes LLP

[57] ABSTRACT

A switch fabric controller comparator system (200) is provided for comparing the contents of a foreground port mapping memory (25) and a background port mapping memory (125). The switch fabric controller comparator system (200) includes the foreground port mapping memory (25), the background port mapping memory (125), and a switch fabric controller comparator (150). ?? The foreground port mapping memory (25) is populated with foreground port mapping data identifying the mapping of an output port of a foreground switch fabric (26) to an input port of the foreground switch fabric (26), and the background port mapping memory (125) is populated with the background port mapping data identifying the mapping of an output port of a background switch fabric (126) to an input port of the background switch fabric (126). Routinely, the switch fabric controller comparator (150) compares the contents of the foreground port mapping memory (25) and the background port mapping memory (125) to determine if any discrepancy exists between the two memories as to which input ports are mapped to which output ports. If a discrepancy or error is found, an error signal is generated by the switch fabric controller comparator (150). The foreground switch fabric controller (24) may log the error signal and enable another signal in response.

18 Claims, 3 Drawing Sheets

U.S. PATENT DOCUMENTS

| | | | |
|---|---|---|---|
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,964,105 | 10/1990 | Schrodt et al. | 370/220 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,072,440 | 12/1991 | Isono et al. | 370/220 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,153,578 | 10/1992 | Izawa et al. | 340/825.21 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 3780/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,327,422 | 7/1994 | Abefelt et al. | 370/371 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |

| | | | |
|---|---|---|---|
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,877 | 6/1995 | Brajzewski et al. | 370/228 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et al. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/219 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/60.1 |
| 5,454,299 | 10/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

OTHER PUBLICATIONS

Flavio Bonomi et al., *The Rate–Based Flow Control Framework for the Available Bit Rate ATM Service*, IEEE Network, Mar./Apr. 1995, pp. 25–39

R. Jain, *Myths About Congestion Management in High Speed Networks*, Internetworking Research and Experience, Vol. 3, 101–113 (1992).

Douglas H. Hunt et al., *Credit–Based FCVC Proposal for ATM Traffic Management (Revision R1)*, ATM Forum Technical Committee Traffic Management Subworking Group, ATM_Forum/94–0168R1, Apr. 28, 1994.

Douglas H. Hunt et al., *Action Item Status for Credit–Based FCVC Proposal*, ATM Forum Technical Committee Traffic Management Subworking Group, ATM_Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM_Forum/94–0492, Apr. 28, 1994.

Richard Bubenik et al., *Leaf Initiated Join Extensions*, ATM Forum Technical Committee, Signalling Subworking Group, ATM Forum 94–0325, Apr. 28, 1994.

Richard Bubenik et al., *Requirements For Phase 2 Signaling Protocol*, ATM Forum Technical Committee, Signalling Subworking Group, ATM Forum 94–1078, Jan. 1, 1994.

H.T. Kung and K. Chang, *Receiver–Oriented Adaptive Buffer Allocation in Credit–Based Flow Control for ATM Networks*, Proceedings of INFOCOM '95, Apr. 2–6, 1995, pp. 1–14.

H.T. Kung et al., *Credit–Based Flow Control for ATM Networks: Credit Update Protocol, Adaptive Credit Allocation, and Statistical Multiplexing,* Proceedings of ACM SIGCOMM '94 Symposium on Communications Architectures, Protocols and Applications, Aug. 31–Sep. 2, 1994, pp. 1–14.

SITA, ATM RFP: C–Overall Technical Requirements, Sep.1994

SWITCH FABRIC CONTROLLER COMPARATOR SYSTEM AND METHOD

RELATED APPLICATIONS

This application claims benefit of U.S. Provisional Application Ser. No. 60/001,498, filed Jul. 19, 1995.

TECHNICAL FIELD OF THE INVENTION

The present invention relates generally to communication switching systems, and more specifically to a switch fabric controller comparator system and method.

BACKGROUND OF THE INVENTION

Usage and demand for modern communication systems continues to soar as users demand more and more sophisticated communication services and bandwidth while relying on the instant availability of these communication systems. Users are demanding that communication systems provide almost instant access to all types of information including voice, video, and data.

Modern communication systems include a collection of components, such as digital switching systems, that communicate, manipulate, and process information in a variety of ways. Digital switching systems are integral components of today's modern communication systems. The availability of communication systems is directly related to the availability of the digital switching systems used in these communication systems. As reliance and the importance of communication systems continues to increase, the availability of the digital switching systems used in these communication systems becomes critically important.

Problems arise when attempting to increase the availability of a digital switching system. The digital switching system may provide redundant capability so that if a circuit or module of the digital switching system fails, a backup circuit or module may be used. Problems arise when transitioning from a system or circuit operating in the foreground to a system or circuit operating in the background or in hot-standby. Performance suffers greatly when the transition causes delays, interruptions in service, and errors. Delays, interruptions in service, and errors often occur because the backup circuit or module is not properly initialized. It is also critical that a hot-standby circuit or module can be relied upon to operate correctly if needed. Overall system performance suffers when system resources are consumed when attempting to verify that a backup circuit or module is operating correctly so that the backup circuit or module may be relied upon in the event of a failure.

SUMMARY OF THE INVENTION

In accordance with the present invention, a switch fabric controller comparator system and method are provided which substantially eliminate or reduce the disadvantages and problems associated with increasing the availability and reliability of the switch fabric of a digital switching system. The present invention verifies that a foreground and a background switch fabric controller are identically mapping the input ports to the output ports of a switch fabric while minimizing or eliminating any adverse effects on actual switching operation.

According to an embodiment of the present invention, a switch fabric controller comparator system is provided that includes a foreground port mapping memory, a background port mapping memory and a switch fabric controller comparator. The foreground port mapping memory stores foreground port mapping data identifying the mapping of an input port of a foreground switch fabric to an output port of the foreground switch fabric, and the background port mapping memory stores background port mapping data identifying the mapping of an input port of a background switch fabric to an output port of the background switch fabric. The switch fabric controller comparator compares the foreground port mapping data to the background port mapping data for every output port.

The switch fabric controller comparator system and method provide various technical advantages. A technical advantage of the present invention includes increased switch availability. Another technical advantage includes the ability to systematically and routinely verify the operation of a background switch fabric controller during actual switch operation to ensure that the background switch fabric controller is operating identically to the foreground switch fabric controller while minimizing or eliminating any adverse effect on overall switch performance. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
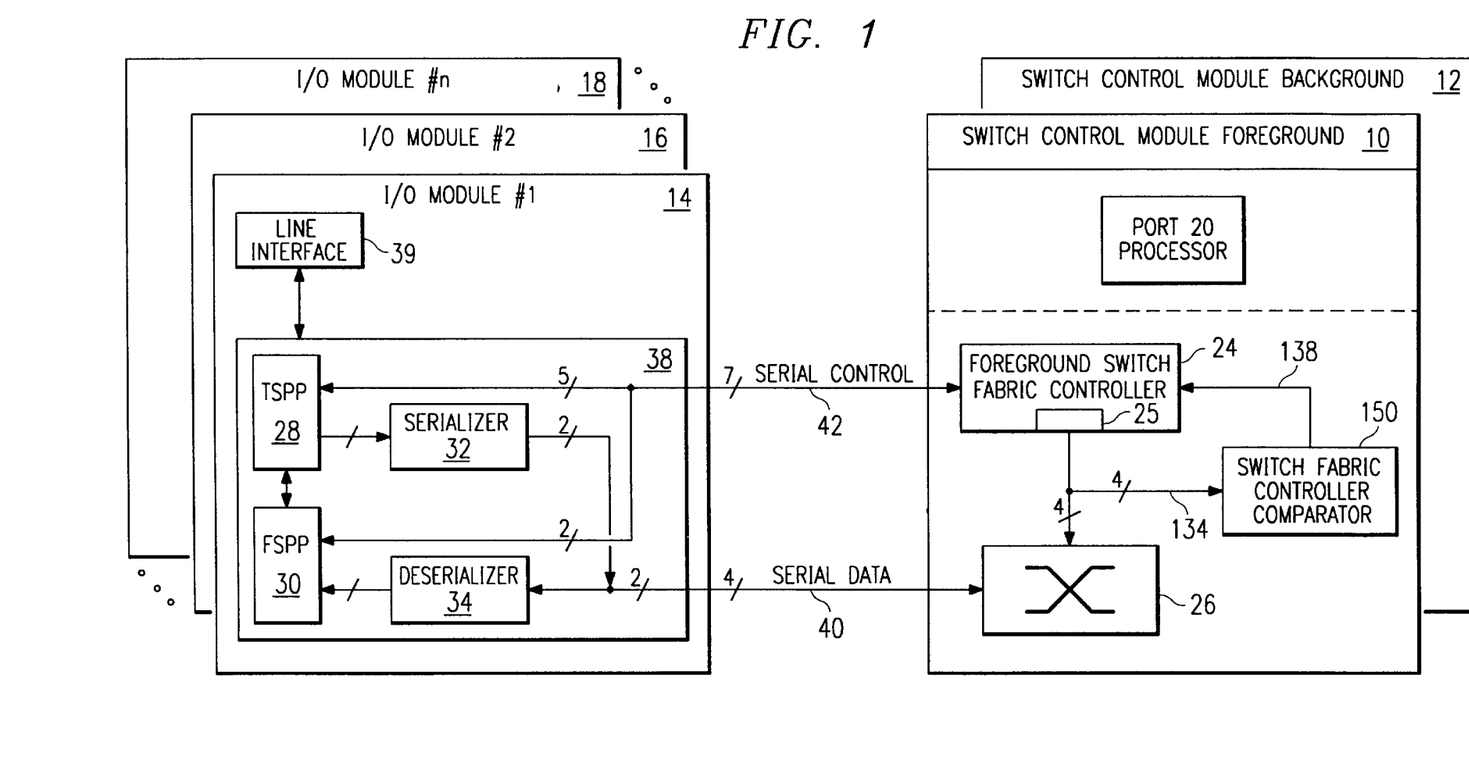
FIG. 1 is an overview block diagram illustrating a control and a data interconnection between a first I/O module and a foreground switch control module and a background switch control module.

FIG. 1 is an overview block diagram illustrating a control and a data interconnection between a first I/O module 14, a foreground switch control module 10, and a background switch control module 12 all used in a digital communication switch. Also shown in FIG. 1 are a plurality of additional I/O modules represented by a second I/O module 16 and an $n^{th}$ I/O module 18. Each of the plurality of I/O modules interconnect with foreground switch control module 10 in the same manner that first I/O module 14 couples to foreground switch control module 10. Background switch control module 12 also interconnects to each of the plurality of I/O modules in the same manner that foreground switch control module 10 interconnects to each of these plurality of I/O modules. Background switch control module 12 operates in the background and serves as a redundant module in the event that foreground switch control module 10 fails or is taken out of service.

In operation, the plurality of I/O modules receive information, such as voice, video, and data, from a corresponding communications link using a variety of access technologies. Each I/O module provide this information to the inputs of a foreground switch fabric 26 of foreground switch control module 10 and background switch control module 12. Foreground switch control module 10, using a foreground switch fabric controller 24 and any available switching scheme, controls the switching of foreground switch fabric 26 so that the communication information provided by each I/O module is properly routed or mapped to the appropriate destination I/O module. Foreground switch control module 10 receives control information from the various I/O modules to assist with carrying out the switching scheme.

First I/O module 14 is representative of the plurality of I/O modules and includes a line interface 39 and a cell flow processor 38. In one embodiment, line interface 39 includes a connectivity engine, a network interworking, and a physical interface to exchange information with a particular type of access technology provided by the communication link or network that is coupled to line interface 39. This coupling is not shown in FIG. 1.

Each of the plurality of I/O modules occupies a particular port in the digital communication switch. Each of the plurality of I/O modules are similar, except for the line interface which allows a particular I/O module to interface with a particular access technology. The access technology may include virtually any communications format or protocol such as asynchronous transfer mode (ATM), cell relay, frame relay, circuit emulation, LAN emulation, internetworking, and the like, and using virtually any physical medium or transmission hierarchy. Line interface 39 may support any suitable communication technique, whether connection-based or connection less. Thus, first I/O module 14 may interface, through line interface 39, with a communication link that supports a particular access technology, while the line interfaces of other I/O modules may support different access technologies. In this manner, information may be received by an I/O module in a particular format, converted to a common or core cell format used in foreground switch control module 10 by the line interface, routed to a destination I/O module through foreground switch control module 10, and finally provided to the communication link coupled to the destination I/O module that uses a completely different access technology than the source communication link.

Cell flow processor 38 provides an interface between line interface 39 and foreground switch control module 10. Cell flow processor 38 interconnects with foreground switch control module 10 using a first I/O serial data signal 40 and a first I/O serial control signal 42. In one embodiment, these may be provided as eleven unidirectional lines. The reference to "lines" may include conductors, couplings, connectors, matings, connections, and the like. Cell flow processor 38 also provides these same signals to background switch control module 12 through similar interconnections. Unlike line interface 39, which may vary from one I/O module to another, cell flow processor 38 has the same structure and performs the same function in all I/O modules. In a particular embodiment, cell flow processor 38 implements a core cell transfer function using ATM with virtual channel (VC) buffer and bandwidth control.

Cell flow processor 38 includes a to-switch port processor (TSPP) 28, a from-switch port processor (FSPP) 30, a serializer 32, and a deserializer 34. In a particular implementation, TSPP 28 and FSPP 30 may be implemented using an application specific integrated circuit (ASIC). Cell flow processor 38 uses TSPP 28 to receive information from line interface 39, to process the information, to provide communication signals to and from foreground switch control module 10, which exchange control information with foreground switch control module 10. TSPP 28 controls access to input buffers and to the bandwidth of foreground switch fabric controller 24 on a per connection basis. TSPP 28 requests and receives grants for switch bandwidth from foreground switch fabric controller 24. TSPP 28 also receives flow control information. FSPP 30 may also be an ASIC. The FSPP 30 controls access to output buffers and linked bandwidth on a per connection basis. FSPP 30 also sends and receives flow control information.

Serializer 32 receives the information from TSPP 28 in parallel format and converts the information to serial format and provides the information as either first I/O serial data signal 40. TSPP 28 may also receive control information from foreground switch fabric controller 24. FSPP 30 receives information from foreground switch control module 10 through first I/O serial data signal 40 and first I/O serial control signal 42. Deserializer 34 receives these data signals where they are converted from serial format to parallel format and then provided to FSPP 30. TSPP 28 and FSPP 30 are in communication with one another.

In one embodiment, foreground switch control module 10 and background switch control module 12 are essentially interchangeable modules with one operating in the foreground and the other operating in the background to provide a redundant system to increase overall system availability. Thus, the following discussion of foreground switch control module 10 may apply equally as well to background switch control module 12.

Foreground switch control module 10 includes a port processor 20, a foreground switch fabric controller 24, a foreground switch fabric 26 having input ports and output ports corresponding to each of the plurality of I/O modules, and a switch fabric controller comparator 150. Port processor 20 is used to communicate with the TSPPs 28 and FSPPs 30 on the I/O modules in the system.

Foreground switch fabric controller 24 controls the operation of foreground switch fabric 26 by determining how the data signals provided from the plurality of I/O modules, such as first I/O serial data signal 40, are interconnected (switched) by foreground switch fabric 26. Foreground switch fabric controller 24 accumulates and arbitrates transfer requests from each I/O module. Foreground switch fabric controller 24 may also maintain and access a topology state for each connection. This topology information controls the fan-in and the fan-out of multipoint connections. In one embodiment, foreground switch fabric controller 24 may include a bandwidth arbiter (BA) ASIC to decide which I/O modules or ports have access to foreground switch fabric 26, and a multipoint topology controller (MTC) ASIC to maintain and access topology states for each connection in the digital communication switch. Foreground switch fabric controller 24 receives control signals from each of the I/O modules, such as first I/O serial control signal 42 from first I/O module 14. Foreground switch fabric controller 24 uses this information in its switching scheme to determine which data signal from all of the I/O modules should be provided at a particular input of foreground switch fabric 26 and routed to a particular output of foreground switch fabric 26.

Once foreground switch fabric controller 24 determines which connection should be made within foreground switch fabric 26, a control signal is provided to the TSPP of the appropriate I/O module so that the correct data signal may be provided to the input port of foreground switch fabric 26 corresponding to that I/O module. For example, first I/O module 14, through TSPP 28, provides first I/O serial control signal 42 to foreground switch fabric controller 24 indicating a request for communication from first I/O module 14. Eventually, foreground switch fabric controller 24 grants the request and communicates the grant to TSPP 28 through first I/O serial control signal 42. At this time, the cell may be transferred from TSPP 28 through first I/O serial data signal 40 to foreground switch fabric 26.

Foreground switch fabric 26, under the control of foreground switch fabric controller 24, maps or switches first I/O serial data signal 40 to the designated output port for receipt by the FSPP of the receiving I/O module. The data signals provided from the various I/O modules, such as first I/O serial data signal 40, may be provided as communication cells having a header portion and a data portion. These communication cells may be provided in asynchronous transfer mode (ATM) format, or the like. The information may then be processed by the line interface of the receiving I/O module and provided in the communication format of the interfacing access technology.

Switch fabric controller comparator 150, described more fully below and shown in FIG. 3, receives a foreground port mapping signal 134 from foreground switch fabric controller 24, and a background port mapping signal 136 from a background switch fabric controller 124, not shown in FIG. 1. Each of these signals are provided from a port mapping memory, such as foreground port mapping memory 25 of foreground switch fabric controller 24. Foreground port mapping signal 134 is the same control signal used to control foreground switch fabric 26 and may be a four bit signal. Background port mapping signal 136 is the same control signal used in background switch control module 12.

Switch fabric controller comparator 150 compares foreground port mapping signal 134 and background port mapping signal 136 to see if foreground switch fabric controller 24 and background switch fabric controller 124, not shown in FIG. 1, are generating the same switching signals. As a result of this comparison, switch fabric controller comparator 150 generates a port error signal 138. Port error signal 138 may be provided to a port error table provided in a memory. For example, foreground switch fabric controller 24 may implement a port error table in memory and receive port error signal 138. Foreground switch fabric controller 24 may perform other actions as a result of the status of the port error table.

Background switch control module 12 receives the same signals from the I/O modules, such as I/O first module 14, that are provided to foreground switch control module 10. Background switch control module 12 operates in the same manner as foreground switch control module 10. In the event that foreground switch control module 10 fails or is taken out of service, background switch control module 12 may operate in the foreground with minimal disruption of service. In one embodiment, port processor 20 switches between foreground control module 10 to background control module 12 in response to external control. However, before taking foreground switch control module 10 out of service or before foreground switch control module 10 fails, it is important to ensure that background switch control module 12 is operating correctly so that service will not be disrupted.

Figure 2:
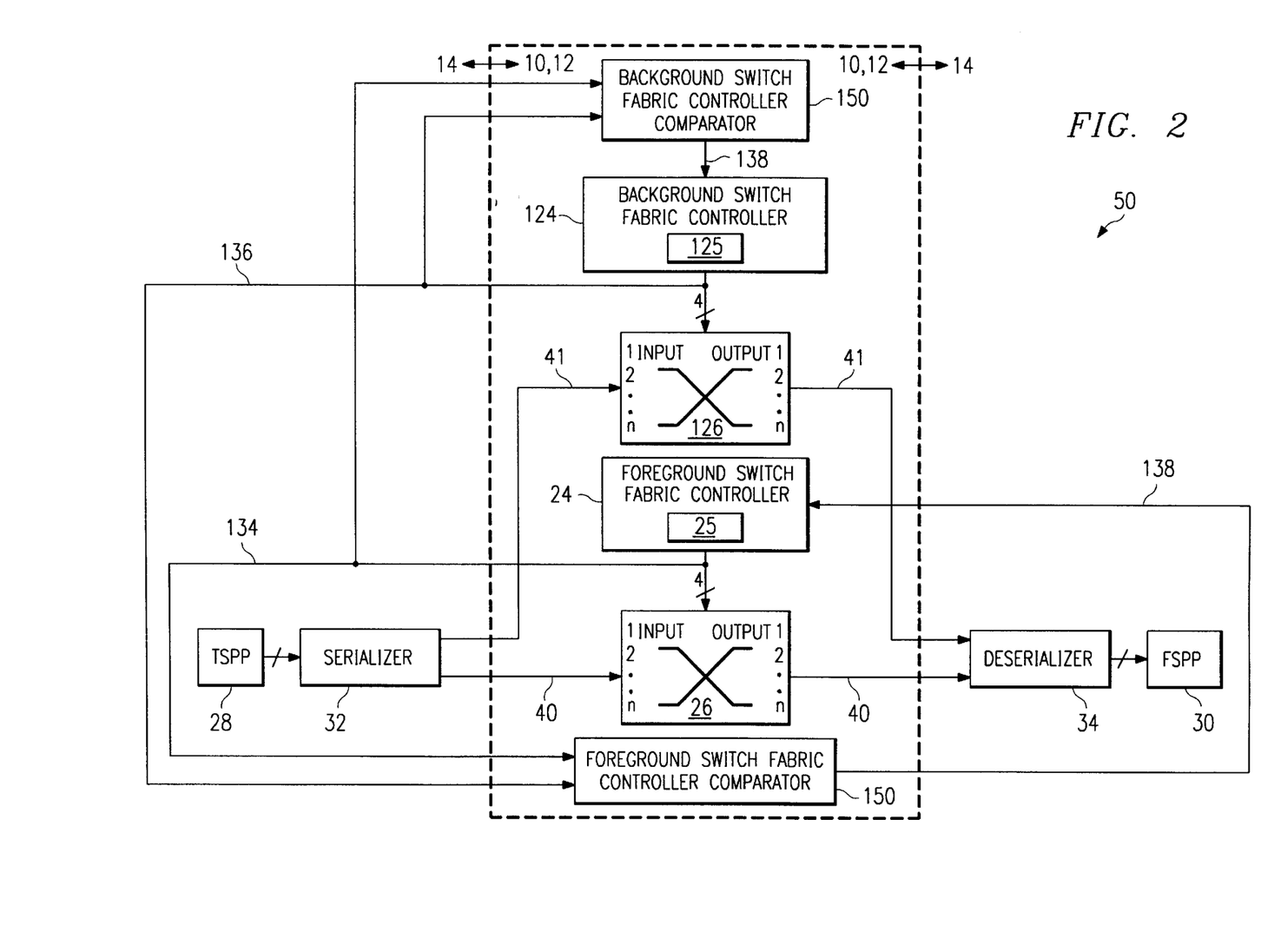
FIG. 2 is a block diagram illustrating a switch fabric controller comparator and the data interconnection between the first I/O module and the foreground switch control module and the background switch control module.

FIG. 2 is a block diagram illustrating switch fabric controller comparator 150 and the data interconnection between the first I/O module 14, the foreground switch control module 10, and the background switch control module 12. FIG. 2 illustrates a switch fabric controller comparator 150 for both the foreground switch fabric 26 and background switch fabric 126. The operation of both comparators 150 is the same. As discussed above, when first I/O module 14 provides information to foreground switch control module 10, the information is correspondingly also provided to background switch control module 12. Background switch control module 12 includes the same or similar components as that provided in foreground switch control module 10. These same or similar components may include a background switch fabric controller 124, and a background switch fabric 126 as shown in FIG. 2. Before both foreground switch control module 10 and background switch control module 12 may both receive the same information, background switch fabric controller 124 and foreground switch fabric controller 24 must be synchronized so that these controllers stay in lock-step. This may include identically configuring control registers, and updating tables and entries. When a communication cell is provided from TSPP 28, it is provided to serializer 32 in parallel format and converted to serial format and provided to processor interface 36. In one embodiment, processor interface 36 then provides the communication cell to background switch fabric 126 through a background first I/O serial data signal 41. This same communication cell is also provided to foreground switch fabric 26 through first I/O serial data signal 40. At this time, both background switch fabric 126 and foreground switch fabric 26, under the control of their respective switch fabric controllers and utilizing the same switching scheme, map or switch the communication cell to a designated output port where the cell may then be provided to that port's I/O module for further processing. In normal operation, first I/O serial data signal 40, as provided at the output of foreground switch fabric 26, is a communication cell that is provided to the designated I/O module. However, if foreground switch control module 10 fails or is taken out of service, then background first I/O serial data signal 41, as provided at the output of background switch fabric 126, may be provided to the designated I/O module.

It is critical that the components of background switch control module 12 are operating correctly so that in the event of a failure, background switch control module 12 may be relied upon for continued operation with minimal interruption of service. Thus, it is desirous to routinely verify the operation of background switch control module 12 to ensure that it is operating correctly while minimizing or eliminating any adverse effect on overall system performance caused by the verification of the background operation. The present invention accomplishes all of this as discussed above and as illustrated below.

This is accomplished using switch fabric controller comparator 150. Switch fabric controller comparator 150 is used to compare foreground port mapping signal 134 and background port mapping signal 136, to determine if foreground switch fabric controller 24 and background switch fabric controller 124 are generating the same mapping or switching signals. As a result of this comparison, switch fabric controller comparator 150 generates port error signal 138. In one implementation port error signal 138 is provided to foreground switch fabric controller 24 which implements a port error table in memory. Foreground switch fabric controller 24 receives port error signal 138 and stores the result in the port error table. Foreground switch fabric controller 24 may enable other signals when the port error table indicates that a predefined number of errors have occurred.

Figure 3:
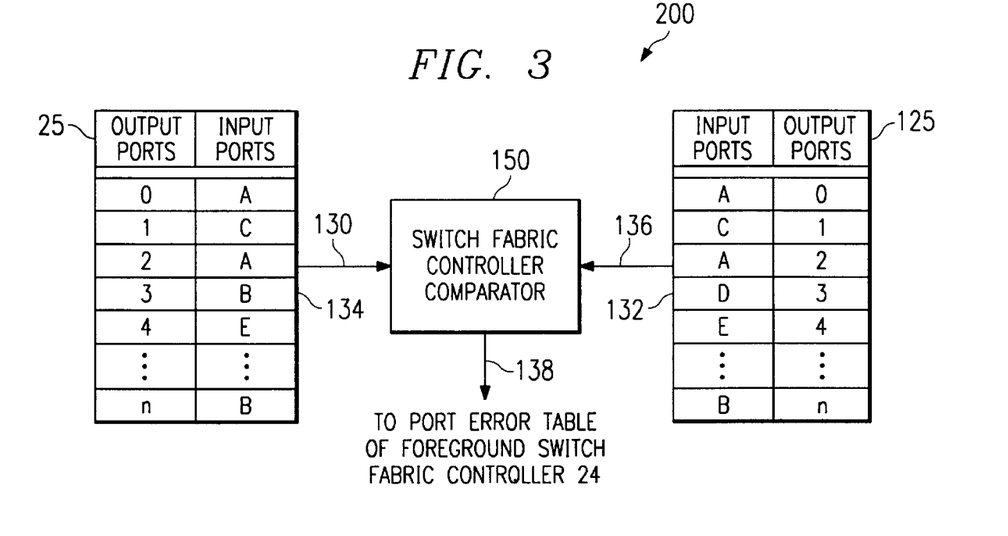
FIG. 3 is a block diagram illustrating a switch fabric controller comparator system including the switch fabric controller comparator.

FIG. 3 is a block diagram illustrating a switch fabric controller comparator system 200 that includes switch fabric controller comparator 150 coupled to foreground port mapping memory 25 and background port mapping memory 125. As shown in FIG. 2, foreground port mapping memory 25 may be implemented in one embodiment as a memory area included in foreground switch fabric controller 24 while background port mapping memory 125 may be included as a memory area in background switch fabric controller 124. However, foreground port mapping memory 25 and background port mapping memory 125 may be implemented independently from their corresponding switch fabric controller.

Switch fabric controller comparator system 200 uses switch fabric controller comparator 150 to compare the contents of foreground port mapping memory 25 and background port mapping memory 125 to determine if a discrepancy or difference exists. If a discrepancy or difference exists, this indicates, generally, that either foreground switch control module 10 or background switch control module 12 are not operating properly.

Foreground port mapping memory 25 and background port mapping memory 125 each contain the input port mappings to each output port of their respective switch fabric. Referring now to foreground port mapping memory 25, in one implementation, the underlying foreground switch fabric 26 contains n output ports and n input ports. The input port mapping for each output port is shown in the column entitled "Input Ports." For example, foreground port mapping memory element 130 corresponds to foreground output port 3 and indicates that foreground input port B has been mapped to foreground output port 3. Background port mapping memory 125 is structured in the same manner and operates in the same manner as just described for foreground port mapping memory 25. For example, background port mapping memory element 132 corresponds to background output port 3 and indicates that background input port D has been mapped to output port 3. A comparison of foreground port mapping memory element 130 of foreground port mapping memory 25 to background port mapping memory element 132 of background port mapping memory 125 indicates that foreground port mapping 25 and background port mapping memory 125 do not correspond identically at output port 3.

Switch fabric controller comparator 150 compares each memory element to determine if the data provided in foreground port mapping memory 25 and background port mapping memory 125 contain equivalent input port mappings for each output port. This may be accomplished using a foreground port mapping signal 134 which provides the contents of foreground port mapping memory 25 on an output-port by output-port basis. Foreground port mapping signal 134 is compared to a background port mapping signal 136 to determine if discrepancies exist. Background port mapping signal 136 is identical to foreground port mapping signal 134 except that it provides the contents of background port mapping memory 125.

Switch fabric controller comparator 150 may include any of a variety of known circuitry such as digital logical circuitry, comparator circuitry, microprocessor circuitry, and the like. For example, a series of digital logic gates, such as AND gates, may be provided in switch fabric controller comparator 150 so that all of the output ports may be compared at one time. The resulting error signal would be a digital signal that indicates which output ports are not identically mapped.

Switch fabric controller comparator 150 provides a port error signal 138 as a result of the comparisons performed on foreground port mapping signal 134 and background port mapping signal 136. Port error signal 138 may be provided to any memory element such as a port error memory. The port error memory may include a port error table that logs or records each time, on an output-port by output-port basis, that foreground port mapping signal 134 differed from background port mapping signal 136. The port error memory may be provided in foreground switch fabric controller 24. If a particular element of the port error table reaches a predefined value, a signal may be enabled indicating that a particular action should be taken. For example, an alarm may be enabled as a result.

Figure 4:
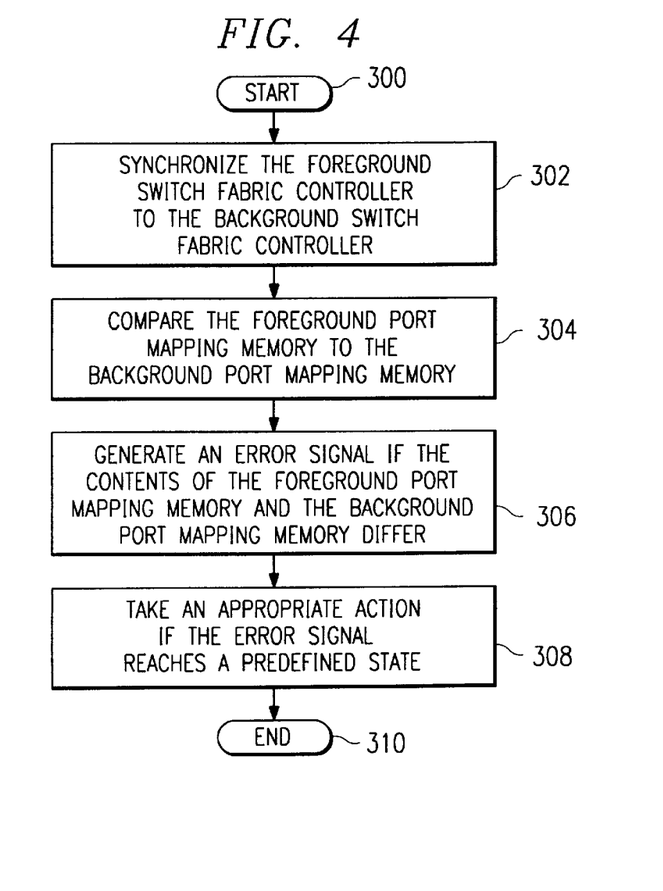
FIG. 4 is a flowchart illustrating a method for operating the switch fabric controller comparator system.

FIG. 4 is a flow chart illustrating a method for operating switch fabric controller comparator system 200. The method starts at step 300 and proceeds to step 302 where the foreground switch fabric controller is synchronized to the background switch fabric controller. This may involve any number of steps to insure that the foreground switch fabric controller and the background fabric controller are receiving the identical signals after being provided in an identical state.

The method proceeds next to step 304 where the foreground port mapping memory is compared to the background port mapping memory. The foreground port mapping memory includes foreground port mapping data and the background port mapping memory includes background port mapping data indicating for each output port which input port is mapped to that output port, for a foreground switch fabric and a background switch fabric respectively. Foreground port mapping memory includes the foreground port mapping data for the foreground switch fabric, such as an n×n cross-point switch fabric. Similarly, the background port mapping memory includes the background port mapping data for the background switch fabric. Step 304 involves comparing each output port memory location of the foreground port mapping memory to the corresponding output port memory location of the background port mapping memory to insure that the input ports mapped to these output ports are the same.

The method proceeds next to step 306 where an error signal is generated if the contents of the foreground port mapping memory and the background port mapping memory differ. For example, the foreground port mapping memory may indicate that input port A is mapped to output port 2 of the foreground switch fabric, while the background port mapping memory may indicate that input port C is mapped to output port 2 of the background switch fabric. In such a case, an error signal will be generated indicating that the foreground switch fabric controller and the background switch fabric controller differ in their switch port mappings.

Proceeding next to step 308, as a result of the error signal being generated, a particular action may be taken if the error signal reaches a predefined state. For example, after a predefined number of errors have been detected, a foreground switch fabric controller may enable a signal indicating that a problem exists between the operation of the foreground switch fabric controller and the background switch fabric controller. The method then concludes at step 310.

Thus, it is apparent that there has been provided, in accordance with the present invention, a switch fabric controller comparator system and method that satisfies the advantages set forth above. The present invention improves overall system availability while eliminating or minimizing any adverse effect on overall system operation. Although the preferred embodiment of the present invention has been described in detail, it should be understood that various changes, substitutions, and alterations may be made to the described embodiment without departing from the spirit and scope of the present invention. The direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention as defined by the following claims.

What is claimed is:

1. A switch fabric controller comparator system comprising:

a foreground port mapping memory including foreground port mapping data identifying the mapping of an input port of a foreground switch fabric to an output port of the foreground switch fabric;

a single background port mapping memory coupled in parallel with said foreground port mapping memory and including background port mapping data identifying the mapping of an input port of a background switch fabric to an output port of the background switch fabric; and a switch fabric controller comparator operable to compare the foreground port mapping data to the background port mapping data for every output port.

2. The switch fabric controller comparator system of claim 1, wherein the switch fabric controller comparator is operable to generate an error signal if the foreground port mapping data does not correspond to the background port mapping data for every output port.

3. The switch fabric controller comparator system of claim 2, further comprising:

a port error memory operable to receive the error signal and to store the error signal.

4. The switch fabric controller comparator system of claim 3, wherein the port error memory is included in a foreground switch fabric controller.

5. The switch fabric controller comparator system of claim 4, wherein a signal is enabled by the foreground switch fabric controller when the contents of the port error memory are in a predefined state.

6. The switch fabric controller comparator system of claim 1, wherein the switch fabric controller comparator performs a comparison of all input port and output port mapping during each clock cycle.

7. The switch fabric controller comparator system of claim 1, wherein the switch fabric controller comparator includes digital logic circuitry to perform comparisons.

8. The switch fabric controller comparator system of claim 7, wherein the digital logic circuitry included an AND gate.

9. The switch fabric controller comparator system of claim 1, wherein the foreground switch fabric and the background switch fabric receive communication cells.

10. The switch fabric controller comparator system of claim 9, wherein the communication cells include a header portion and a data portion.

11. The switch fabric controller comparator system of claim 10, wherein the communication cells are asynchronous transfer mode formatted cells.

12. A method for operating a switch fabric controller comparator system, the method comprising the steps of:

synchronizing the operation of a foreground switch fabric controller associated with a foreground port mapping memory that is coupled in parallel with a background switch fabric controller associated with a single background port mapping memory;

comparing the foreground port mapping memory to the background port mapping memory after said step of synchronizing; and generating an error signal if the contents of the foreground port mapping memory differ from the background port mapping memory.

13. The method of claim 12, wherein the foreground switch fabric controller is a foreground bandwidth arbiter, and the background switch fabric controller is a background bandwidth arbiter.

14. The method of claim 12, further comprising the steps of:

generating a foreground port mapping data scheme and storing the foreground port mapping data scheme in the foreground port mapping memory, and generating a background port mapping data scheme and storing the background port mapping data scheme in the background port mapping memory prior to comparing the foreground port mapping memory to the background port mapping memory.

15. The method of claim 12, further comprising the step of:

storing the error signal in a port error memory.

16. The method of claim 15, wherein the error signal is provided in a switch fabric controller.

17. The method of claim 15, further comprising the step of:

enabling a signal if the contents of the port error memory reaches a predefined level.

18. The method of claim 15, further comprising a step of:

logging the error signal on an output port by output port basis.

* * * * *